United States Patent [19]
Lorie et al.

[11] 4,445,197
[45] Apr. 24, 1984

[54] WEAK SYNCHRONIZATION AND SCHEDULING AMONG CONCURRENT ASYNCHRONOUS PROCESSORS

[75] Inventors: Raymond A. Lorie; Hovey R. Strong, both of San Jose, Calif.

[73] Assignee: International Business Machines Corporation, Armonk, N.Y.

[21] Appl. No.: 315,568

[22] Filed: Oct. 27, 1981

[51] Int. Cl.³ .............................................. G06F 9/46
[52] U.S. Cl. .................................... 364/900; 364/200
[58] Field of Search ... 364/200 MS File, 900 MS File

[56] References Cited

U.S. PATENT DOCUMENTS

| | | | |
|---|---|---|---|
| 4,050,097 | 9/1977 | Miu et al. | 364/200 |
| 4,096,571 | 6/1978 | Vander Mey | 364/200 |
| 4,141,067 | 2/1979 | McLagan | 364/200 |
| 4,145,739 | 3/1979 | Dunning et al. | 364/200 |
| 4,191,997 | 3/1980 | Luiz | 364/200 |
| 4,219,873 | 8/1980 | Kober et al. | 364/200 |
| 4,223,380 | 9/1980 | Antonaccio et al. | 364/200 |
| 4,253,144 | 2/1981 | Bellamy et al. | 364/200 |
| 4,320,457 | 3/1982 | Tanikawa | 364/200 |
| 4,374,414 | 2/1983 | Comfort et al. | 364/200 |
| 4,384,322 | 5/1983 | Bruce et al. | 364/200 |

OTHER PUBLICATIONS

*Operating System Principles*, Per Beinch Hansen, "Process Cooperation", Prentice-Hall, Inc., N.J., 1973, pp. 89–122.
*Operating Systems*, Lorin and Deitel, "Asynchronous Concurrent Processes", Addison-Wesley Pub. Co., 1981, pp. 269–284.
Ford and Hamacher, "Hardware Support for Inter-Process Communication and Processor Sharing", IEEE Third Annual Symposium on Computer Architecture, 1975, pp. 113–118.

*Primary Examiner*—Jerry Smith
*Assistant Examiner*—Gary V. Harkcom
*Attorney, Agent, or Firm*—R. Bruce Brodie

[57] ABSTRACT

Weak synchronization and scheduling of each processor among concurrent asynchronous processors is governed by either task execution invoked by an external response indicating its low bid among the well-ordered set of most recently bid signals, task deferred until such indication is received from subsequent bid evaluations, or task aborted as by transfer to another task upon indication that an instantaneous bid was not the minimum.

5 Claims, 3 Drawing Figures

WEAK SYNCHRONIZATION AND SCHEDULING AMONG CONCURRENT ASYNCHRONOUS PROCESSORS

FIELD OF THE INVENTION

This invention relates to process synchronization and scheduling relying upon external means to accomplish coordination.

BACKGROUND ART

Lorin and Deitel, "Operating Systems", Addison-Wesley Publishing Co., 1981, at pp. 269-284, classify systems into two classes, These are (1) processors which know of each other's existence and explicitly coordinate their use of a shared resource and (2) those which are unaware of each other and rely upon an external monitor or kernal function. Examples of cooperating processors are (a) those that share a resource that neither produces and (b) those that are interdependent (as a producer and consumer) of the resource around which they are synchronized. Excellent discussions may be found in Per-Brinch Hansen, "Operating System Principles", Prentice-Hall series in Automatic Computation, 1973, in the section on Process Cooperation, between pp. 89-122. A more recent exposition by Hansen appears in "The Architecture of Concurrent Programs," Prentice-Hall Series in Automatic Computation, 1977.

Mutual exclusion has as its object the control of a reusable resource so that it is never coupling more than one processor at a time. This means that a resource may not be accessed by more than one processor. Scheduling the mutually exclusivity of resources under centralized synchronized (tightly coupled) control is a well-solved problem. However, scheduling external means for rapidly coordinating concurrent asynchronous processors working at different speeds is decidedly non-trivial.

A desirable solution recognizes the occurrence of race condition and the varying speeds of tasks executing on different processors. Furthermore, two tasks on different processors may notice and act on the availability of a sharable resource before either has had opportunity to block the other. Another caution is that no individual task be blocked indefinitely by other tasks or their processors from requesting the resource. That is, the wait of a task/processor for a resource should be finite, whence bounded. Relatedly, the term 'critical region' should be taken to mean the execution of those instruction segments involving use of the sharable resource.

Other forms of scheduling processor access to resources include serialization such as by way of enqueueing so as to ensure that only one processor at a time enters a critical region. One may superimpose a priority in such a queue. Central to any access discipline is the establishment of synchronization. By definition, concurrent asynchrous processors are out of step both in phase and cycle time. Relatedly, Ford and Hamacher, "Hardware Support for Interprocess Communication and Processor Sharing," IEEE Third Annual Symposium on Computer Architecture, 1975, pp. 113-118, discloses semaphores and mailbox memories with reference to an external dispatcher scheduling asynchronous processor sharing of resources. While the design is efficacious, it is slow since it requires numerous memory updates, table and status lookups.

THE INVENTION

It is an object of this invention to devise a method for weakly synchronizing and externally scheduling n concurrent asynchronous processors absent extensive status processing. The object is satisfied by invoking a numerical bid from each of the processors. An unoccupied processor might raise a low bid while a busy processor would be required to raise a high bid. An external bid resolution device in addition to acknowledging receipt of the bid signal sends back an indication to each processor whether its most recent bid was the minimum of the set of most recently invoked bid signals. The processor having the low bid can then access the resource. The remaining processors can optionally either defer execution of a task until the minimum bid indication based upon subsequent bid comparisons is received, or abort participation by selecting another task.

Because processors might simultaneously tie in the low bid competition, provision is made for distinguishing bids by appending to them identifying values unique to each processor. Because this could result in processors with higher valued identifiers being locked out or "starved," the bidding process is sometimes separated into two phases such that a processor cannot reenter the second phase until all those already in that phase have in turn won the low bid competition. In order to ensure a clean separation between phases so that no race condition results from processors in transition from first to second phase, provision is made for treating selected bid values (called "reset to zero" values) that have won the competition (allowing entry to the second phase) as if they were the lowest value that a processor could bid until the so selected processors change their bids (by actually making the second phase bid).

DESCRIPTION OF THE PREFERRED EMBODIMENT AND INDUSTRIAL APPLICABILITY

The invention relates to weak synchronization and scheduling of concurrent asynchronous processors. In the following description in the terms "bid" and "bidding" signals are used synonymously. In this regard, the context of the invention is that of plural processors seeking access to a shared resource. The question arises, how is this access to be allocated? One form of self-scheduling is that of contention. In this invention, each processor asserts a "number" from a specified finite set of numbers. This number is indicative of the state of the processor. Further, this number may be likened to a "bid". A centralized facility is used for resolving the bids from the processors during one or more contention cycles.

Other terms such as "a finite well-ordered set of numbers" relates to the observation that every non-empty set of positive integers has a least member. This means that the set of bidding numbers available to each processor has a least (lowest) member as does the set of bidding numbers actually asserted by the processors taken as a group, i.e. one number per processor during each contention cycle. The term "finite" means non-infinite. That is, the cardinality (number of members in a specifiable set) of a set is finite. Lastly, "externally measured n-way compare" refers to the parallel comparison among the set of bidding numbers asserted during a given contention cycle in order to ascertain the minimum. It relies upon a bidding scheme based upon the observation that any subset of a finite well-ordered set of numbers exhibits a minimum. Consequently, an externally measured n way comparison of the most recent bidding number from each of n counterpart processors must yield a minimum. Significantly, two well-ordered sets are involved. The first is a well-ordered set of bidding numbers from which a processor may select. The other is the set of numbers which are actually bid one from each participating processor. Now, since each processor can raise a signal talking on one of the values in its well-ordered set asynchronously, any central polling can only detect the most recent set of instantaneous signals. As previously mentioned, some of the values in the signal set from which each processor selects are designated "reset to zero" values. The invention involves the centralized comparison of the most recently received set of signals to ascertain (a) the minimum, (b) whether the signals are "reset to zero", and (c) which processor(s) have won this bidding cycle.

Figure 1:
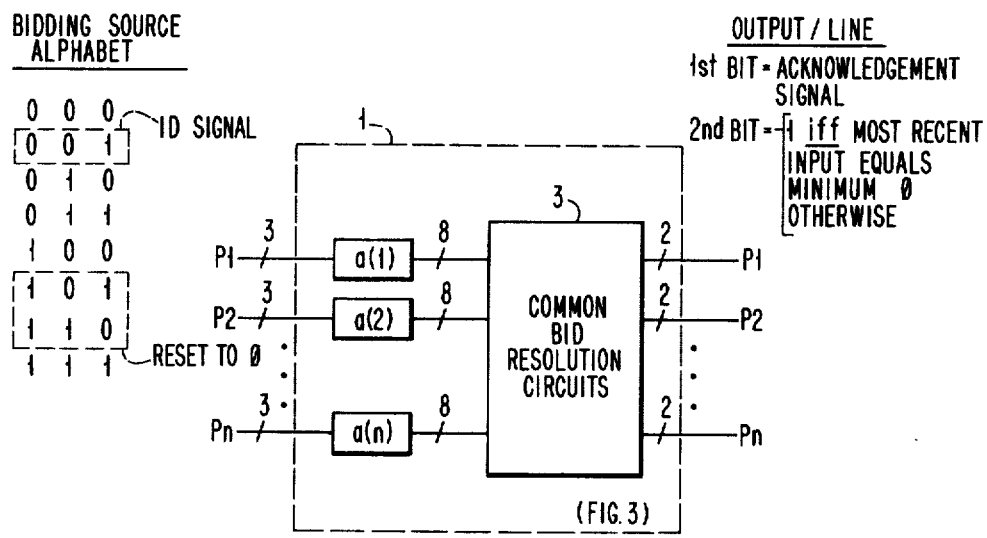
FIG. 1 shows the external termination of processors in a BID resolution network.

Referring now to FIG. 1, there is shown the plurality of asynchronous processors terminating in a BID resolution network. Also shown is an example "source alphabet" three bits wide defining the number sequences from 0 to 7. For purposes of this example, each processor may select a value from 0 to 7. The value 0 is the minimum of this set. Values 5 and 6 induce the network 3 to treat the receive signal as if it were 0 for comparison cycles subsequent to a cycle in which the value is the minimum of those most recently received. Each processor designated P-1, P-2 . . . P-n transmits its three-bit wide bid signal to a translation component a(1), a(2), . . . a(n). This component concatenates five extra bits. These five bits are all 0 except when the three input bits represent the id signal (1 in the example), in which case the five bits will represent the port identity. The resulting eight-bit signal is then n-way compared. A two-bit wide response is then sent from network 3 back to each of the processors. A busy processor bids a 111 (7) signal. It need not rebid since a subsequent poll will treat the last bid as the most recently received.

The first bit of the two-bit wide output is an acknowledgment signal. The second bit position is coded such that it is a 1 if and only if the most recent input among the well-ordered bidding set was a minimum, otherwise the second bit is a 0. Significantly, the two-bit output is sent at the end of each of the n-way comparison device cycle to each processor.

The bidding signal 1 designating the id signal in FIG. 1 is translated by the network into n distinct signals corresponding to the n ports of the device. A different id being received for each port. The id signal is provided for contention resolution. It allows tie breaking when several processors simultaneously send the same signal and only one is supposed to receive the 1 bit at a time.

The "reset to zero" signals are used to prevent critical race conditions. They provide a way to synchronize all processors at a minimum. Otherwise, there would be no way to guarantee that processors were simultaneously in the state of having most recently sent 0. Without 'reset to 0', it would be difficult to invoke mutual exclusion by way of the id signal. There would be no way to ensure lockout avoidance.

Referring again to FIG. 1 and the example, it is the case that since different id signals are not needed until they are compared, they may be generated at the ports as extra bits concatenated with the bid received from the counterpart processor. Thus, if a signal other than the id signal is sent, the bits concatenated therewith would be all 0. However, when the id signal is sent, then the bits concatenated must identify the specific port. Illustratively, when 001 is received at the fifth port, this is converted to 00100101. When another signal 011 is received at any port, it is converted to 01100000.

Figure 3:
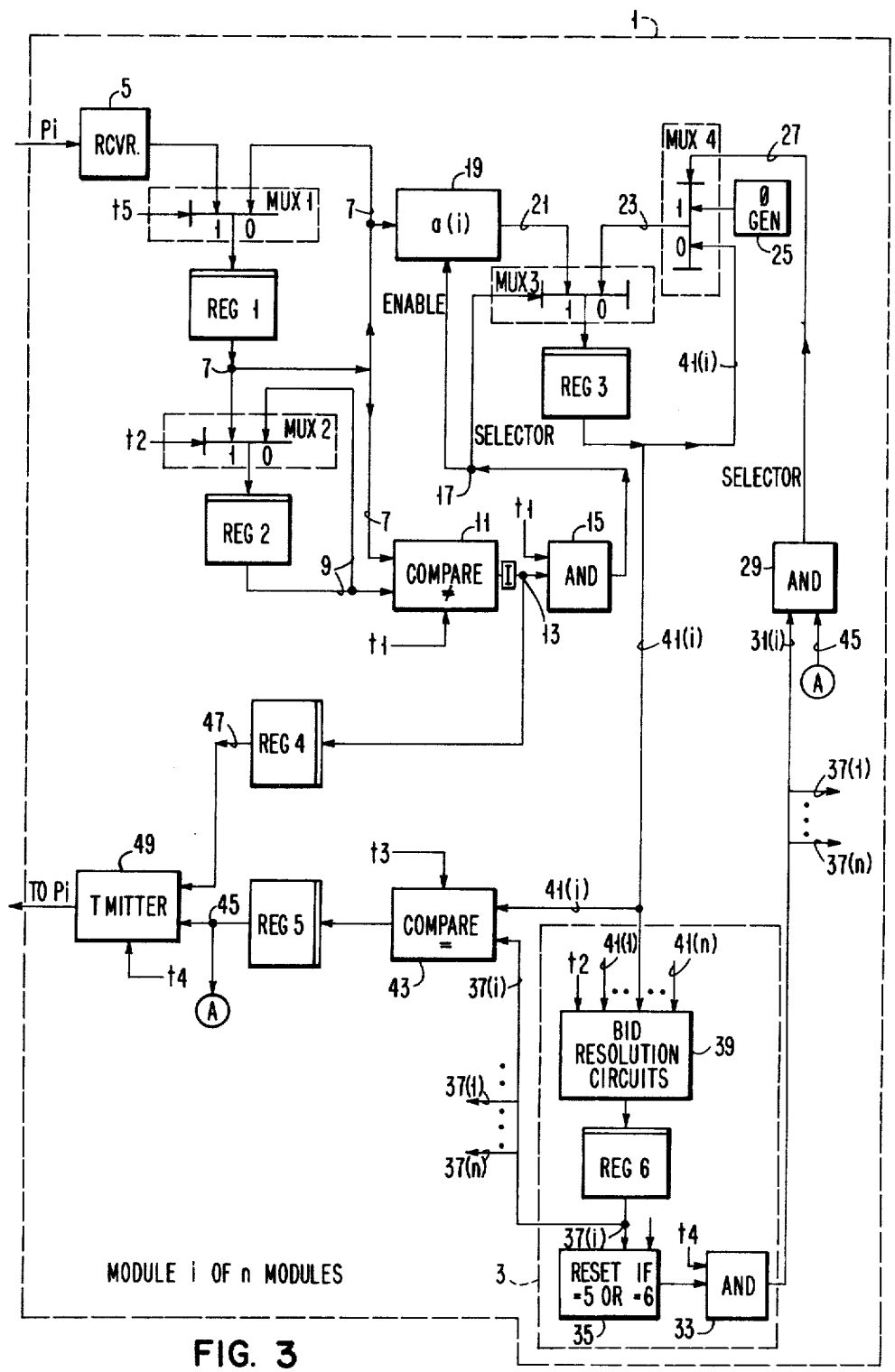
FIG. 3 sets out detailed logic of a BID resolution network according to the invention.

Each translation component a(i) represents logic which coverts every value x except the value ONE into $32 \times$. It transforms the value ONE into $32+$ port identity. The common BID resolution circuits/network 3 represent logic for an n-way comparison of 8-bit signals. Any one of a number of comparison ladder networks can implement such an n-way compare by way of a comparison tree. Reference may be made to Knuth, "The Art of Computer Programming," Vol. 3, Sorting and Searching, especially a comparison tree described at pp. 182–183 thereof. Such a tree would more particularly be interposed in the BID resolution circuits 39 of FIG. 3. Significantly, network 3 is formed from n modules, an arbitrary one of which is laid out in FIG. 3. Here the output from each of the components a(i) is applied over path 41i to BID resolution circuit 39. The comparison result is loaded into register 6 and represents the minimum of the n bids applied to circuit 39. The outputs of register 6 over path 37 are fed to each of the n modules. Comparison circuit 43 in register 5 determines whether the bid applied to that module represented a minimum. If so, the appropriate output back to the processor is coded 1 or 0. A more detailed description of the circuit action of FIG. 3 will be discussed subsequently.

The invention requires that each processor have embedded therein synchronizing primitives that bound critical sections of an executing instruction sequence utilizing a sharable, reusable resource. This means that the operating system for each processor can interpret and execute instructions termed Synchronous Send (SS) and Send And Branch (SB). Further defined, SS x is an instruction sending a bidding signal of value x to the comparator which waits until it receives an indication from the comparator that the bidding signal x is a minimum of the most recently received bidding signals. SB x y is an executable instruction which sends a bidding value x to the comparator and branches to an instruction at location y if the immediate response indicates that x is not the minimum of the most recently received signals. A special case of the instruction SB is the instruction S x. S x, when executed, sends a bidding signal x and immediately branches to the next instruction irrespective of the external response. In this regard, "scheduling" involves utilization by a processor of one of the following strategies; that of mutual exclusion with bounded waiting, priority synchronization, serialization, and do-once-only.

Figure 2:
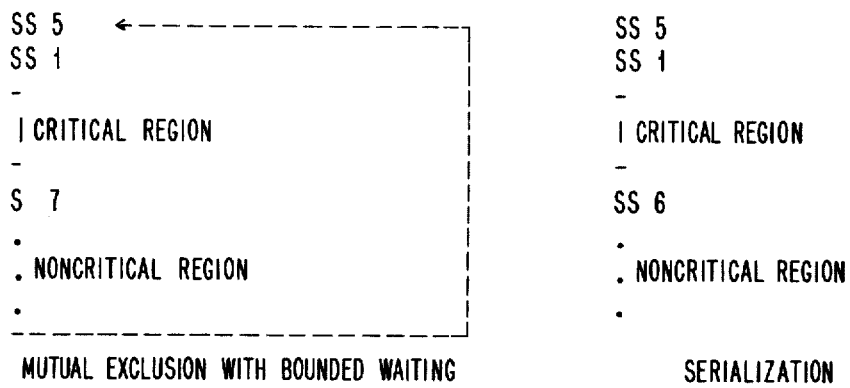
FIG. 2 depicts embedded synchronization primitives bounding critical sections of task instruction sequences.
Figure 2:
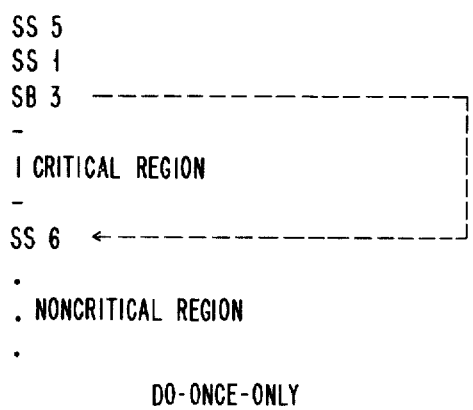

Referring now to FIG. 2, it should be considered that mutual exclusion with bounded waiting is a method for preventing more than one of the asynchronous processors from acquiring a resource concurrently. It guarantees that no processor will be excluded from the resource indefinitely as long as each processor relinquishes the resource after a finite time. The critical region where a processor would be executing the instructions of the task utilizing the shared resource of interest is protected by embedding synchronous send and send instructions in the stream bounding said critical section. In the figure, instructions SS 5 and SS 1 guard entry while S 7 represents a branch to a non-critical region. A loop assumes that a processor may be involved in rebidding several times.

In the example for mutual exclusion, the instruction SS 5 represents the first phase of the bidding. When 5 is found to be the minimum of most recently received values (which can only happen when no processor is in either the critical region or the second phase of bidding), then those processors sending 5 received a result bit of 1 admitting them to the second phase, and simultaneously the registers holding their values for comparison purposes are reset to zero. The instruction SS 1 represents the second phase of bidding in which each processor reveals its port id. After a bid has been received from each processor in phase two, no 0 values will remain in the bidding and the processors in phase two will enter the critical region by turns in order to increasing id. The instruction S 7 represents the release of the resource or exit from the critical region. Receipt by the comparison logic of 7 from the current winner, allows another processor in phase two to take its place as the winner, or, in case no processors remain in phase two, allows the completion of phase one for any processors waiting there.

Assuming no processors are in either phase two or the critical region at the beginning, there can be at most one processor admitted to the critical region at any subsequent time because any set or port ids has a unique minimum and no processor is allowed to enter phase two bidding late. Moreover, a processor waiting in phase one may be passed only once by a processor of lower id and not at all by one of higher id. Thus, no processor will wait for more than $2(n-1)$ accesses of the critical region by other processors. Consequently, this method achieves mutual exclusion with bounded waiting.

The object of serialization is to weakly synchronize the processors and to ensure that only one processor at a time enters the critical region utilizing a sharable, reusable resource. Serialization differs from mutual exclusion only in that the processors are weakly synchronized. At this point, a definition of "weak synchronization" is in order. In this invention, the term "weak synchronization" among a plurality of concurrent asynchronous processors exists if tasks being executed by the processor can have synchronization points at which processors wait until all are synchronized otherwise execution proceeds asynchronously.

The 'do-once-only' operation shown in FIG. 2 ensures that only one of the weakly synchronized processors may execute a task in a critical region. The SB 3 instruction provides an upper bound to the critical region. The SS 6 instruction constitutes a lower bound to said region. Consequently, only one processor (the one with highest prior id) may access the region and all other processors must bypass it.

The foregoing forms of synchronization and scheduling find use in the context of high volume homogenous concurrent transactions against a data base. It is clear that independent weakly synchronized processors may process batches of these transactions simultaneously. By using the above scheduling, transaction throughout available from multiprocessor systems may be increased. For instance, serialization can replace some of the more expensive communications involving locks and deadlock detection. Also, do-once-only allows a critical region to be executed once for cooperating tasks when its independent execution on each processor would have to be serialized.

Referring again to FIG. 3, the actions of the n-way comparison and bid resolution arrangement 1 may be envisioned over five time intervals. A bid value is applied from processor Pi through receiver 5 and at time t5 multiplexer MUX gates the path from receiver 5 into register 1. In the times between t1 and t5, after selecting receiver 5, the contents of register 1 are circulated over a path involving node 7 and the other input of MUX 1 into register 1. At time t2, the contents of an older polling would be moved from register 1 to register 2. A new bid value is detected by way of a comparison circuit 11 ascertaining the match or mismatch conditions between register 1 and register 2 contents over paths 7 and 9, respectively. If there is a mismatch, then the latest value represents a different bid. A match is taken to mean that the processor bids the same value. A mismatch signal conditions AND gate 15 to enable the translation component 19 to append appropriate unique identification bits to the bid value. These are applied over path 21 from the translation component a(i) through MUX 3 into register 3. In the absence of a new value, the contents of register 3 are refreshed by way of a reentrant path over 41i through MUX 4 into the input 23 to MUX 3. Each of the bid values is applied from each of the n modules over an appropriate path from $41(1) \ldots 41(i) \ldots 41(n)$ to bid resolution circuit 39. As previously mentioned, the minimum value from resolution circuit 39 is entered into register 6 and broadcast simultaneously to each comparison circuit of each module. Only when there is a match condition between the bid value on 41i and the comparison value on 37i will the output from comparison circuit 43 load a 1 into register 5 and send back to the appropriate processor an indicator of minimum bid through transmitter 49. The acknowledgement signal is paced by the output from compare circuit 11 into register 4 through path 47 into transmitter 49. Clearly, the two bit positions are respectively represented by the contents of registers 4 and 5.

If the most recently received bid value stored in register 3 and applied over path 41 is a reset to zero value, this is indicated by a signal from compare logic 35 gated over combinational logic 33 and 29 to force a 0 into register 3 over a path defined by MUX 4, 23, MUX 3 into register 3. Note that since the contents of block 3 are common, then the reset signal would be applied to every other module to be ANDed with the value of register 5 traveling path 45. It would force a 0 into the counterpart register 3 only where the most recent received value was 5 or 6 and was minimal.

While the invention is particularly with reference to a preferred embodiment, it is appreciated that its departure from the prior art is to use the first term of a well-ordered set of numerical bid signals as the control for selecting processor access to a shared resource with non-minimum signals invoking the protective primitives of either waiting or aborting in other processors. Significantly, weak synchronization is not necessary in order to execute mutual exclusion with bounded waiting according to this invention. Further, the bid signals from each processor may be accummulated serially so that an apparatus for bid resolution embodying this invention might attach a larger number of processors since more pins would be available under such serial accummulation at the expense of speed. It will be further understood by those skilled in this art that various other changes in the form and details may be made therein without departing from the spirit and scope of the invention.

We claim:

1. A method for weakly synchronizing and externally scheduling a plurality of processors with reference to mutually exclusive access by one processor of the plurality to a shared resource, each processor executing tasks asynchronously with respect to the task execution by the other processors, each processor generating an associated numerically coded identity signal, comprising the steps of:
   (a) selectively generating one of a first set of numerically coded signals by each processor and indicative of the processor's internal state (i.e. idle, busy, waiting);
   (b) sensing the numerically coded signal from each processor, the sensed signals collectively constituting a second set of numerically coded signals, both the first and second sets of signals being well ordered in that there always exists at least one minimum valued signal in each set, each sensed signal also constituting a numerical bid for mutually exclusive access to the shared resource;
   (c) providing external indication to each processor whether its sensed signal was the minimum valued signal in the second set of signals; and
   at each processor, either
   (d) executing a task including that portion requiring uninterrupted access to the shared resource upon indication that the corresponding sensed signal was minimum valued,
   (e) deferring execution of a task until indication that its sensed signal is minimum valued is received, or
   (f) responsive to the indication that its sensed signal was not minimum valued, selecting another task.

2. A method according to claim 1, characterized in that the step of sensing the numerically coded signals includes the step of
   processing selected values of the numerically coded signals as if the values were the minimum valued signal of the first set of signals with respect to subsequent determinations of the minimum valued signal of the second set of signals.

3. A method according to claim 1, wherein at each processor the execution of a task includes the sequential execution of instructions, the steps further including either:
   (a) deferring execution of the next instruction until an indication is received, or
   (b) executing a branch in response to an indication that its sensed signal was not the minimum valued of the second set of signals.

4. A method for weakly synchronizing and externally scheduling n processors with reference to the mutually exclusive access by one of the processors to a shared resource, n being a positive integer, each processor executing tasks asynchronously with respect to the task execution by the other processors, each processor continuously generating a numerically coded signal from a first set of numerically coded signals resident therein and indicative of its processing state, each processor being coupled to a common evaluation facility through a counterpart port, comprising the steps of:
   (a) sensing the currently generated numerically coded signal from each processor $1, 2, \ldots, i, \ldots n$ either in the form of an integer magnitude in the range from 1 to n or a reserved word k;
   (b) converting the reserved word k sensed at the counterpart port to a unique port identity magnitude in the positive real number range k to $k+1$;
   (c) n-way comparing each currently sensed signal from each processor through its counterpart port; and
   (d) sending to each processor indication of whether its most recently sensed signal is the minimum of a second set of signals consisting of all the most recently sensed signals.

5. A method according to claim 4, characterized in that the method comprises the further step of processing selected magnitudes of the sensed signals converted to unique port identities in the integer value range from 1 to n as if the values were zero with respect to subsequent n-way comparisons of the current sensed signal from each processor upon the condition that said selected magnitudes are found to be minimum valued among the current sensed signals.

* * * * *